United States Patent
Chen

(10) Patent No.: US 6,824,491 B2
(45) Date of Patent: Nov. 30, 2004

(54) POWER TRANSMISSION DEVICE WITH AUTOMATIC SPEED SWITCHING MECHANISM

(75) Inventor: Ting-Kuang Chen, Keelung (TW)

(73) Assignee: Power Network Industry Co., Ltd., Taoyuan (TW)

( * ) Notice: Subject to any disclaimer, the term of this patent is extended or adjusted under 35 U.S.C. 154(b) by 0 days.

(21) Appl. No.: 10/400,098

(22) Filed: Mar. 25, 2003

(65) Prior Publication Data

US 2004/0192489 A1 Sep. 30, 2004

(51) Int. Cl.[7] ................................................. F16H 3/74
(52) U.S. Cl. ...................................... 475/266; 475/299
(58) Field of Search .................................. 475/266, 299

(56) References Cited

U.S. PATENT DOCUMENTS 5,897,454 A * 4/1999 Cannaliato .................. 475/265

* cited by examiner

*Primary Examiner*—Dirk Wright

(57) ABSTRACT

A power transmission device that is capable of automatic speed switching according to external load is disclosed, including a frame in which a transmission mechanism and a torque feedback mechanism are received. The torque feedback mechanism includes a torque resistant member so that when the load torque is smaller than its resistant torque, the speed reduction mechanism of the transmission mechanism is retained at a first, high-speed low-torque stage. When the load torque is larger than its resistant torque, a sliding ring of the torque feedback mechanism pushes a shifting gear so that the sped reduction mechanism is shifted to a second, low-speed high-torque stage. The speed reduction mechanism automatically shifts the speed reduction mechanism when the load torque increases or reduces so that the mechanical efficiency of the transmission device can be increased.

2 Claims, 4 Drawing Sheets

POWER TRANSMISSION DEVICE WITH AUTOMATIC SPEED SWITCHING MECHANISM

FIELD OF THE INVENTION

The present invention relates to a power transmission device that includes a torque feedback mechanism to change the position of a shift gear so as to change the speed of the transmission device. The speed of the transmission device is automatically switched to a proper value when load changes.

BACKGROUND OF THE INVENTION

A conventional power transmission device, especially for electric spinning tools, such as electric drills and electric screwdrivers, includes a multiple-stage power transmission. A speed reduction mechanism is incorporated to provide multiple speeds associated torque change in accordance with the multiplicity of stages. Generally, the speed reduction mechanism is composed of a planetary gear system and clutch or driving members that are manually controlled to switch the speed between the multiplicity of stages. Due to the manual control, an operator has to judge the situation of the tool and decide when to activate the speed reduction mechanism in order to obtain desired torque or speed. However, manual operation is apparently not a feasible way to optimize the operation efficiency of the driving motor.

Therefore, it is desired to have an automatic mechanism for switching the speed of a transmission device based on load torque in order to optimize the operation of the transmission device.

SUMMARY OF THE INVENTION

In accordance with an aspect of the present invention, there is provided an automatic speed switching mechanism for a power transmission device, which comprises a torque feedback mechanism. The torque feedback mechanism includes a pushing wheel and a sliding ring engaging the pushing wheel. A C-shaped clamp and a compression spring which is fit over the frame and retained between ridges of the frame and the clamp. The angular position of the pushing wheel is limited by a torsion spring that is fixed to the frame. The sliding ring is limited to be moved axially in the frame. The transmission mechanism has a shifting gear which has inner teeth engageable with first planet gears and second planet gears. The shifting gear has an annular groove with which a plurality of pins on the clamp engage so as to retain the shifting gear in a first, high-speed low-torque stage while the shifting gear is engaged with the two planet gears, or retain the shifting gear in a second, low-speed high-torque stage and only engaged with the second planet gears. When the load torque on the pushing wheel is smaller than the force of the torsion spring and compression spring, the shifting gear is retained at the first stage and co-rotates with the two planet gears. When the load torque is larger than the force of the torsion spring and compression spring, it rotates and pushes the sliding ring by the inclined faces so that the sliding ring pushes the shifting gear which is in the second stage and cannot rotate due to the engagement of the protrusions of the frame and the notches of the shifting gear. The speed reduction mechanism of the transmission mechanism automatically shifts the speed reduction mechanism when the load torque increases or reduces so that the mechanical efficiency of the transmission device can be increased.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
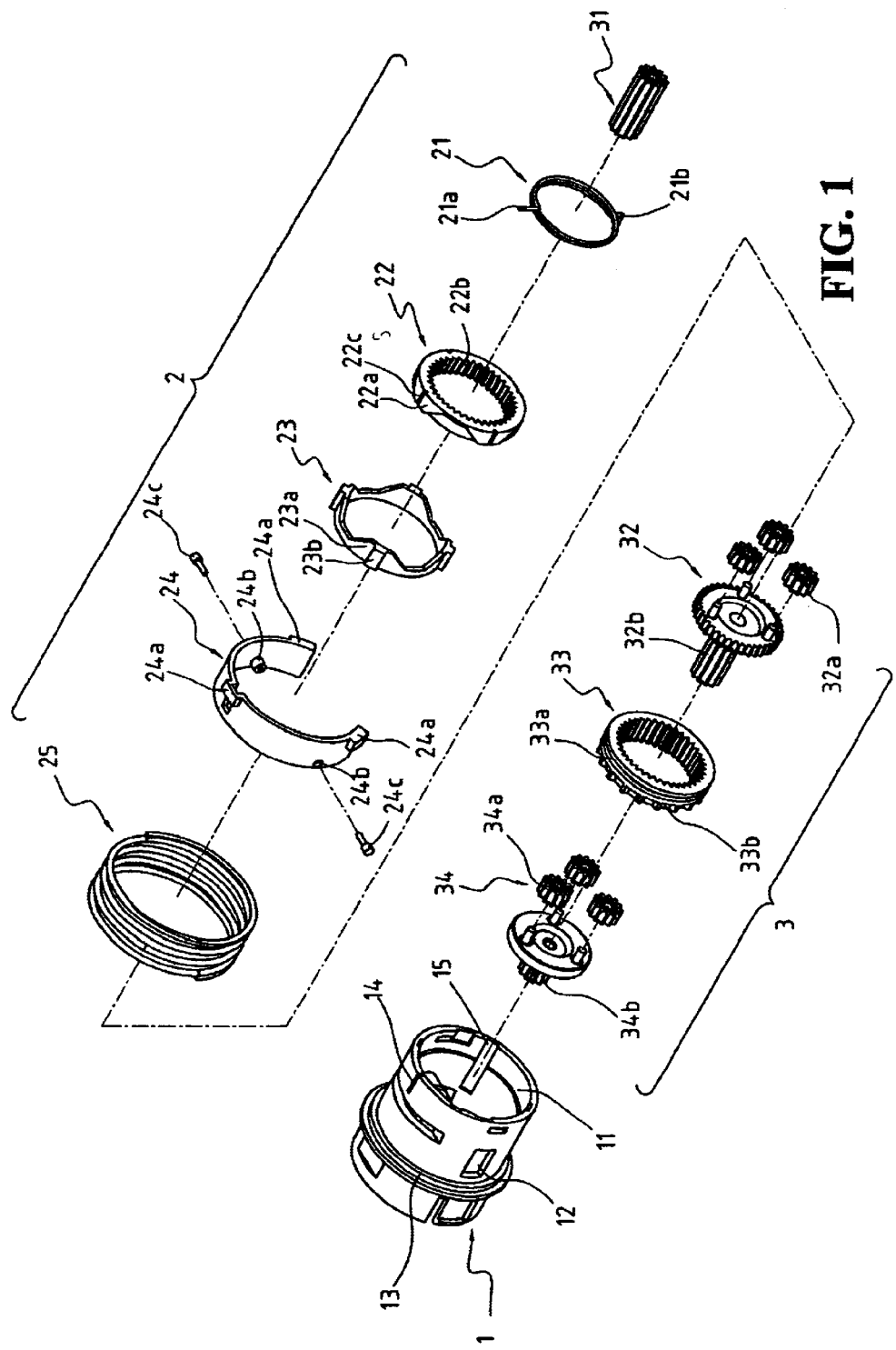
FIG. 1 is an exploded view of a power transmission device in accordance with the present invention.
Figure 2:
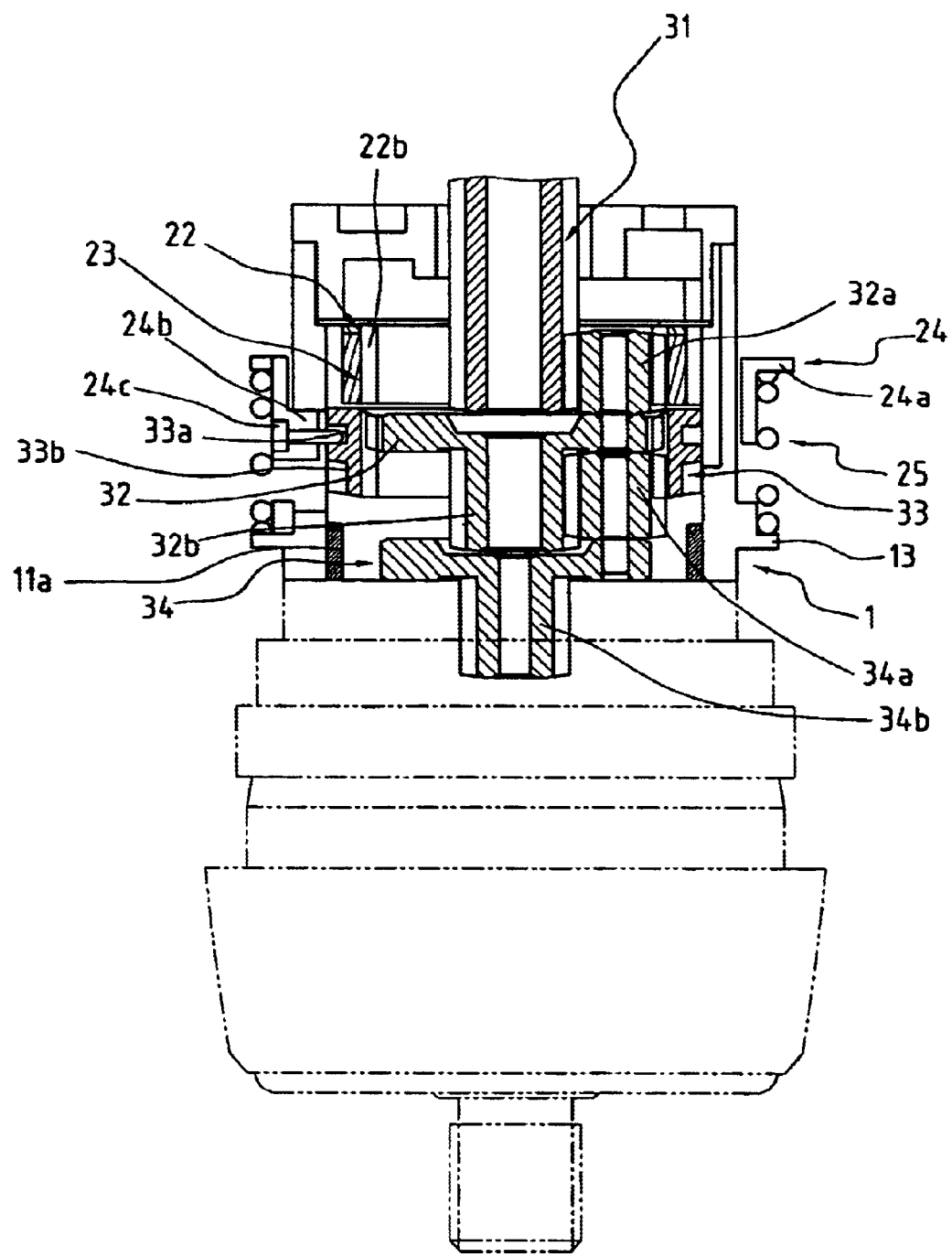
FIG. 2 is a cross-sectional view of the power transmission device of the present invention in a first stage which is a high-speed low-torque condition.

Referring to the drawings and in particular FIGS. 1 and 2, a power transmission device of the present invention comprises a frame 1, a torque feedback mechanism 2 and a transmission mechanism 3. The frame 1 comprises a cylindrical case defining a hollow chamber 11 and forming a plurality of protrusions 11a extending inward from an inside surface of the chamber 11. A plurality of slots 12 is defined through the wall of the frame 1 in the longitudinal direction. A plurality of ridges 13 extends from an outer surface of the frame 1. A slit 14 is defined in the wall of the frame 1 at an open end of the chamber 11. A plurality of axial grooves 15 is defined through the wall of the frame 1.

The torque feedback mechanism 2 comprises a torsion spring 21, a pushing wheel 22, a sliding ring 23, a C-shaped clamp 24 and a compression spring 25. The pushing wheel 22 has a plurality of trapezoid blocks 22a formed on an outside surface thereof. Inner threads 22b are defined in an inner periphery of the pushing wheel 22. A surface groove 22c is defined longitudinally in the outer surface of the pushing wheel 22. A plurality of trapezoid portions 23a is formed on the sliding ring 23. A plurality of ribs 23b is formed on an outside surface of the sliding ring 23. The sliding ring 23 is received in the chamber 11 of the frame 1 and fit over the pushing wheel 22 with the trapezoid portions 23a engaging the trapezoid blocks 22a of the pushing wheel 22 and the ribs 23b received in the axial grooves 15 of the frame 1 whereby the sliding ring 23 is movable longitudinally in the chamber 11 of the frame 1. A plurality of lugs 24a is formed on an outer surface of the clamp 24 and a plurality of pin holes 24b is defined through the clamp 24 and located corresponding to the slots 12 in the frame 1. Each pin hole 24b receives a pin 24c. The compression spring 25 is fit over the frame 1 and retained between the rides 13 of the frame 1 and the lugs 24a of the clamp 24. The compression spring 25 is deformable by the movement of the clamp 24 in the axial direction so as to provide a longitudinal force. The torsion spring 21 has a first end 21a engaging the surface groove 22c of the pushing wheel 22, and a second end 21b engaging the slit 14 of the frame 1 so as to resiliently maintain a position relationship between the pushing wheel 22 and the frame 1.

The transmission mechanism 3 includes an input gear 31, a front speed reduction gear 32, a shifting gear 33 and a rear speed reduction gear 34. The input gear 31 is connected to an input power source that is not shown. The front speed reduction gear 32 has outer teeth and includes a plurality of planet gears 32a rotatably mounted to one surface thereof and a driving gear 32b on an opposite surface of the front speed reduction gear 32 for transmitting mechanical power to the rear speed reduction gear 34. The planet gears 32a engage both inner teeth 22b of the pushing wheel 22 and the input gear 31 so as to form a planetary speed reduction system. The shifting gear 33 has inner teeth and an annular groove 33a is defined in an outer surface of the shifting gear 33f. A plurality of notches 33b is defined in the outer surface of the shifting gear 33 at an end thereof. The pins 24c extend through the slots 12 in the frame 1 and engaging with the annular groove 33a. The protrusions 11a of the frame 1 are engageable with the notches 33b for rotatably fixing the shifting gear 33 in the chamber 11 of the fire 1 at a low-speed high-torque condition. The rear speed reduction gear 34 is a circular disk having a surface on which a plurality of planet gears 34a is rotatably mounted. An output gear 34b is formed on an opposite surface of the circular disk. The planet gears 34a engage the drive gear 32b and the inner teeth of the shifting gear 33 so as to form a planetary speed reduction mechanism.

The receiving chamber 11 receives the transmission mechanism 3 and the torque feedback mechanism 2 in sequence. In a first stage which is a high-speed low-torque condition in the illustrated embodiment, the clamp 24 is retained in an initial position by the compression spring 25 where the pins 24c are located at an upper section of the slots 12. Due to the engagement between the pins 24c and the annular groove 33a of the shifting gear 33, the shifting gear 33 is located at a topmost position with respect to the frame 1. Under this circumstance, the trapezoid blocks 22a of the pushing wheel 22 and the trapezoid portions 23a of the sliding ring 23 completely engage each other. Angular position of the pushing wheel 22 with respect to the frame 1 is retained by the torsion spring 21 while axial position of the sliding ring 23 is retained by the shifting gear 33, which is retained by the compression spring 25.

Figure 3:
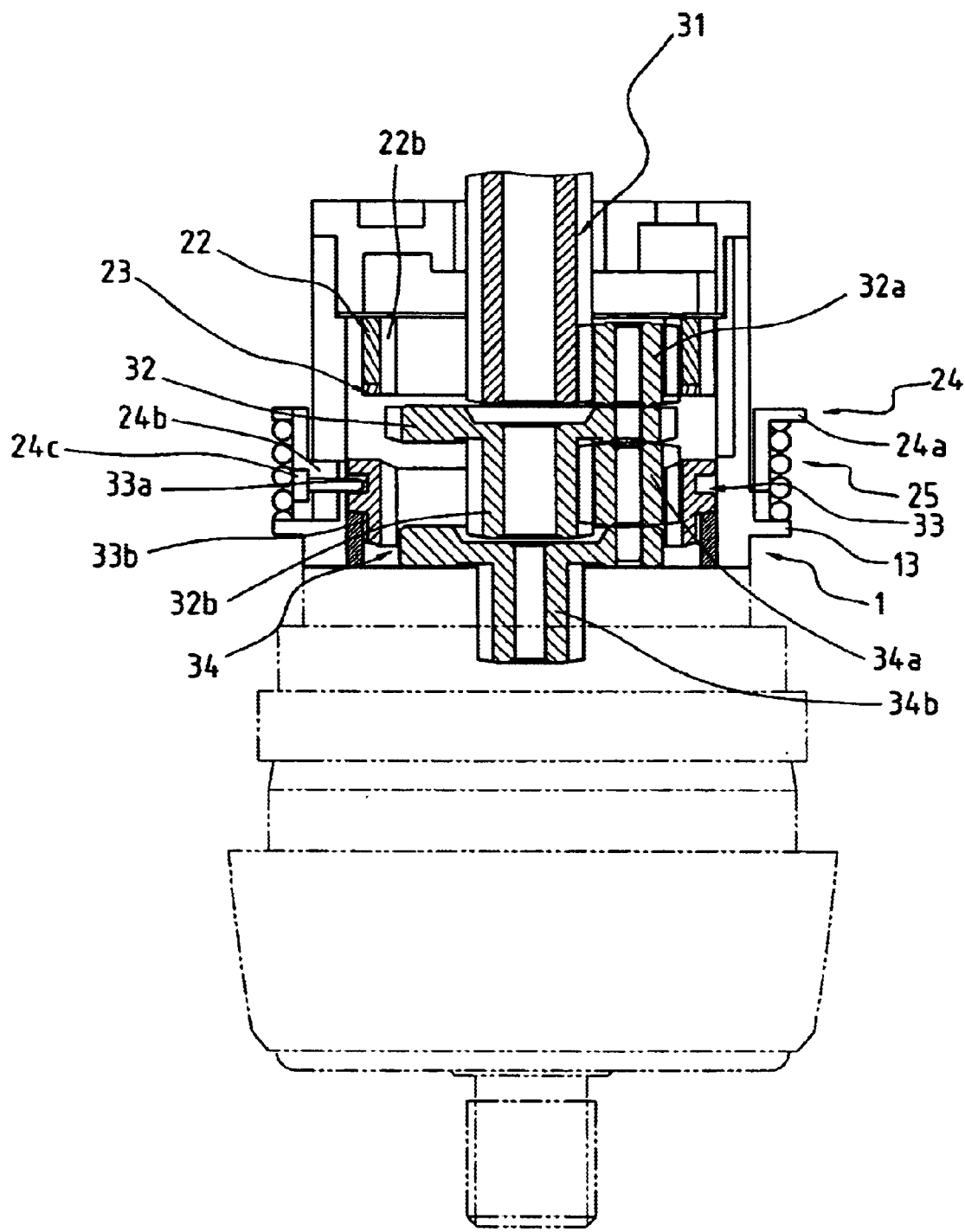
FIG. 3 is a cross-sectional view of the power transmission device of the present invention in a second stage which is a low-speed high-torque condition.
Figure 4:
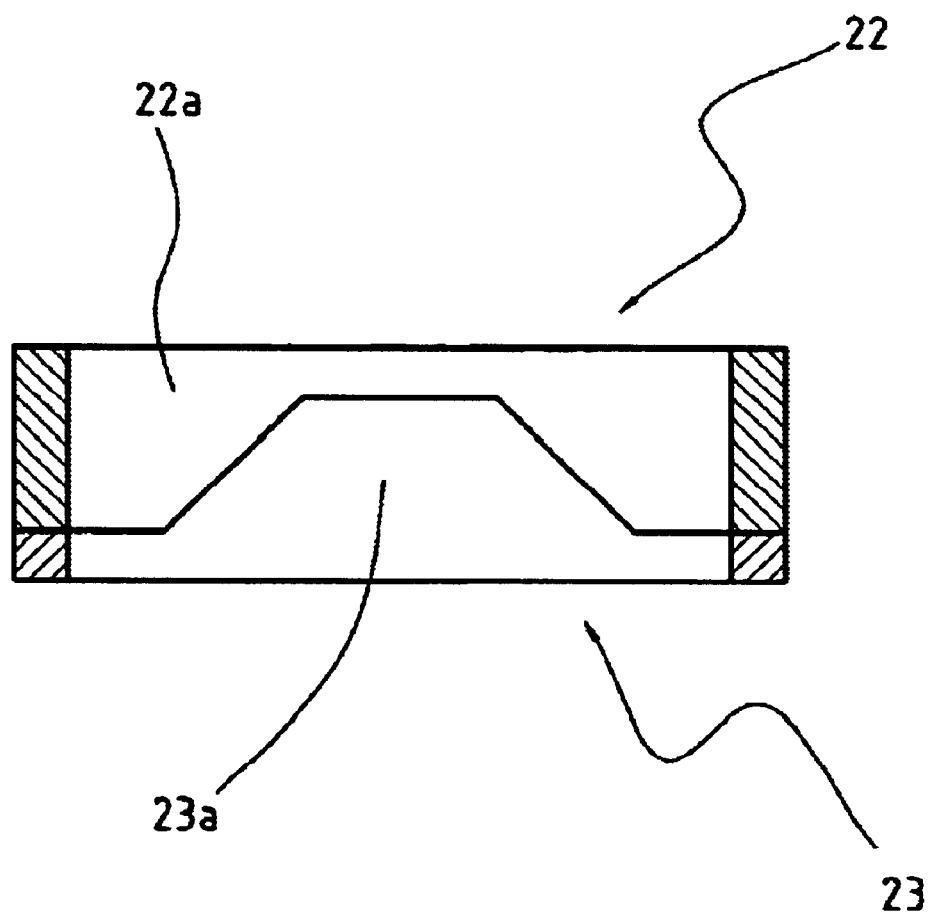
FIG. 4 shows that a pushing wheel of the power transmission device engaging a sliding ring.

Referring to FIGS. 3 and 4, when the a large torque is required, the input gear 31 of the transmission mechanism 3 increases the torque transmitted to the front speed reduction gear 32, which in turn causes the planet gears 32a of the front speed reduction gear 32 to impart a reaction torque in reverse direction to the inner teeth 22b of the pushing wheel 22 so as to rotate the pushing wheel 22. Nevertheless, the rotation of the pushing wheel 22 is restrained by the force of the torsion spring 21 and the compressing spring 25. Inclined side faces of the trapezoid blocks 22a of the pushing wheel 22 induce a camming action on inclined side faces of the trapezoid portions 23a of the sliding ring 23 whereby, when the reaction torque of the pushing wheel 22 is large enough, the sliding ring 23 is forced to move axially by the camming action of the inclined side faces of the trapezoids 22a, 23a and guided by the engagement between the ribs 23b and the axial grooves 15. The sliding ring 23 pushes the shifting gear 33, which, due to the engagement between the pins 24c and the annular groove 33a, drives the clamp 24 to axially move in unison therewith. The clamp 24 is resiliently biased by the compression spring 25 and a reaction force against the movement of the clamp 24 is induced. Under this circumstance, when the torque applied to the pushing wheel 22 by the front speed reduction gear 32 reaches a predetermined threshold value, the trapezoid portion 23a of the sliding ring 23 moves along the inclined sides of the trapezoid blocks 22a of the pushing wheel 22, bringing the sliding ring 23 away from the pushing wheel 22. This disengages the shifting gear 33 from the front speed reduction gear 32 and the shifting gear 33 is now only engaging the planet gears 34a. A further speed reduction is obtained and a maximum torque is induced on the output gear 34b. The shifting gear 33 now reaches the bottom position to allow the notches 33b to engage the protrusions 11a in the chamber 11 of the frame 1 thereby fixing the shifting gear 33.

The torque of the shifting speed reduction mechanism is determined by the torsion spring 21 and the compression spring 25. This can be changed by replacing the springs 21, 25 with new ones having different spring constants.

The automatic shifting device can be used as a power transmission device in electric drills. When drilling, if a small amount of torque is required, the torque applied on the pushing wheel 22 from the front speed reduction gear 32 cannot overcome the resistant force from the torsion spring 21 and the compression spring 25, so that the pushing wheel 22 does not rotate. The sliding ring 23 and the shifting gear 33 are retained in their first stage of speed. The shifting gear 33 is engaged with the planet gears 34a of the rear speed reduction gear 34 and the front speed reduction gear 32. The shifting gear 33 co-rotates with the front speed reduction gear 32 and the rear speed reduction gear 34. The result is located in the maximum value of the curve of the torque vs. revolution. If a large torque is required, the input gear 31 increases the torque gradually and the torque applied onto the pushing wheel 22 from the front speed reduction gear 32 overcomes the resistant force from the torsion spring 21 and the compression spring 25. The pushing wheel 22 rotates when the torque increases and the sliding ring 23 and the shifting gear 33 are in its lower most position. The shifting gear 33 is disengaged from the front speed reduction gear 32 and engaged with the planet gears 34a of the rear speed reduction gear 34. The shifting gear 33 is not rotated due to the engagement of the notches 33b and the protrusions 11a. This provides the first stage of speed and the result is located in the maximum value of the curve of the torque vs. revolution.

While we have shown and described the embodiment in accordance with the present invention, it should be clear to those skilled in the art that further embodiments may be made without departing from the scope of the present invention.

What is claimed is:

1. A power transmission device comprising:

a frame having a plurality of slots defined through a wall thereof, a plurality of axial grooves defined through the wall of the frame, a plurality of protrusions extending from an inside surface of the frame and a ridge defined on an outer surface of the frame;

a transmission mechanism comprising a shifting gear having inner teeth engageable with first planet gears and second planet gears, the first planet gears having outer teeth and the shifting gear having an annular groove defined in an outer periphery thereof, a plurality of notches defined in the outer surface of the shifting gear so as to engage with the protrusions of the frame;

a torque feedback mechanism comprising a pushing wheel and a sliding ring, each of the sliding ring and the pushing wheel having a plurality of inclined faces, a C-shaped clamp and a compression spring which is mounted to the frame and limited between ridges of the frame and the clamp, the sliding member having ribs which are inserted in the axial groove of the frame so that the sliding ring is movable axially along the axial groove, the clamp having a plurality of pins extending through the slots of the frame and engaging the annular groove of the shifting gear so as to selectively restrain the shifting gear in a first position and engaging the first planet gears and the second planet gears, and selectively restrain the shifting gear in a second position and only engaging the second planet gears;

wherein when the pushing wheel is rotated, the inclined faces of the pushing wheel drive the inclined faces of the sliding ring which pushes the shifting gear and drives the compression spring so as to generate axial force;

wherein when the shifting gear is in the first position, the shifting gear co-rotate with the first planet gears and the second planet gears; and wherein when the shifting gear is in the second position, the notches of the shifting gear engage the protrusions of the frame for rotatably fixing the shifting gear.

2. The power transmission device as claimed in claim 1, wherein the torsion feedback mechanism comprises a torsion spring which has a first end fixed to the pushing wheel and a second end fixed to the frame.

* * * * *